US012775241B2

(12) United States Patent
Fuji et al.

(10) Patent No.: US 12,775,241 B2
(45) Date of Patent: Oct. 27, 2026

(54) WATCH DIAL AND WATCH

(71) Applicant: SEIKO EPSON CORPORATION, Tokyo (JP)

(72) Inventors: Tsubasa Fuji, Shiojiri (JP); Ami Kugimoto, Shiojiri (JP)

(73) Assignee: SEIKO EPSON CORPORATION (JP)

(*) Notice: Subject to any disclaimer, the term of this patent is extended or adjusted under 35 U.S.C. 154(b) by 430 days.

(21) Appl. No.: 18/414,697

(22) Filed: Jan. 17, 2024

(65) Prior Publication Data

US 2024/0241479 A1 Jul. 18, 2024

(30) Foreign Application Priority Data

Jan. 18, 2023 (JP) ................................ 2023-005625

(51) Int. Cl.

*G04B 19/12* (2006.01)
*G04B 19/08* (2006.01)
*G04B 45/00* (2006.01)

(52) U.S. Cl.

CPC ............ *G04B 19/12* (2013.01); *G04B 19/08* (2013.01); *G04B 45/0015* (2013.01); *G04B 45/0084* (2013.01)

(58) Field of Classification Search

None

See application file for complete search history.

(56) References Cited

U.S. PATENT DOCUMENTS

| | | | | |
|---|---|---|---|---|
| 3,910,033 | A * | 10/1975 | Saito | G04B 19/12 968/156 |
| 12,379,692 | B2 * | 8/2025 | Fuji | G04B 19/12 |
| 2011/0123815 | A1 * | 5/2011 | Kawakami | C23C 28/322 428/457 |
| 2017/0060093 | A1 * | 3/2017 | Awano | G04C 10/02 |
| 2018/0217558 | A1 * | 8/2018 | Furusato | G04B 37/22 |
| 2018/0217559 | A1 | 8/2018 | Furusato | |
| 2020/0095673 | A1 | 3/2020 | Manasterski et al. | |
| 2020/0310350 | A1 * | 10/2020 | Ishida | G04B 19/12 |
| 2021/0063968 | A1 * | 3/2021 | Furusato | G04B 19/12 |
| 2022/0413439 | A1 * | 12/2022 | Fuji | G04B 19/12 |
| 2024/0427292 | A1 * | 12/2024 | Fuji | G04B 19/12 |

FOREIGN PATENT DOCUMENTS

| | | | |
|---|---|---|---|
| CH | 717875 | A2 | 3/2022 |
| EP | 3626854 | A1 | 3/2020 |
| EP | 3896191 | A1 | 10/2021 |
| JP | 2006-214733 | A | 8/2006 |
| JP | 2018-124267 | A | 8/2018 |

* cited by examiner

*Primary Examiner* — Derek S. Chapel
(74) *Attorney, Agent, or Firm* — Harness, Dickey & Pierce, P.L.C.

(57) ABSTRACT

A watch dial includes a base material made of metal with a surface having unevenness formed by machining, a first coloring film formed at the surface of the base material by a dry plating method, and including a stack of at least one layer of an oxide film or a fluoride film, and at least one layer of a metal layer, and a second coloring film formed on a part of the first coloring film by coating. The watch dial includes unevenness formed on the base material, the first coloring film formed by a dry plating method, and the second coloring film formed by coating, and thus can achieve new and complex expression, and improve the aesthetics of the watch dial and the watch.

8 Claims, 8 Drawing Sheets

WATCH DIAL AND WATCH

The present application is based on, and claims priority from JP Application Serial Number 2023-005625, filed Jan. 18, 2023, the disclosure of which is hereby incorporated by reference herein in its entirety.

BACKGROUND

1. Technical Field

The present disclosure relates to a watch dial and a watch.

2. Related Art

JP-A-2018-124267 discloses, as a watch dial, a dial in which a toning film composed of a multi-layer metal oxide film is formed at the surface of the base material by ion plating. In addition, an uneven pattern may be provided on the surface of the base material by satin processing or the like.

In the case where a toning film is formed by ion plating or the like on the surface of the base material provided with the minute unevenness, a thin toning film can be formed, which allows coloring while taking advantage of the minute unevenness of the surface of the base material.

Although forming a toning film by ion plating or the like on the surface of the base material provided with the minute unevenness can provide a watch dial with aesthetic qualities, there is a need for watch dials and watches with new and unprecedented aesthetic qualities.

SUMMARY

A watch dial of the present disclosure includes a base material made of metal with a surface having unevenness formed by machining, a first coloring film formed at the surface of the base material by a dry plating method, and including a stack of at least one layer of an oxide film or a fluoride film, and at least one layer of a metal layer, and a second coloring film formed on a part of the first coloring film by coating.

A watch of the present disclosure includes an exterior case, and the above-described watch dial that is disposed inside the exterior case.

DESCRIPTION OF EMBODIMENTS

First Embodiment

Figure 1:
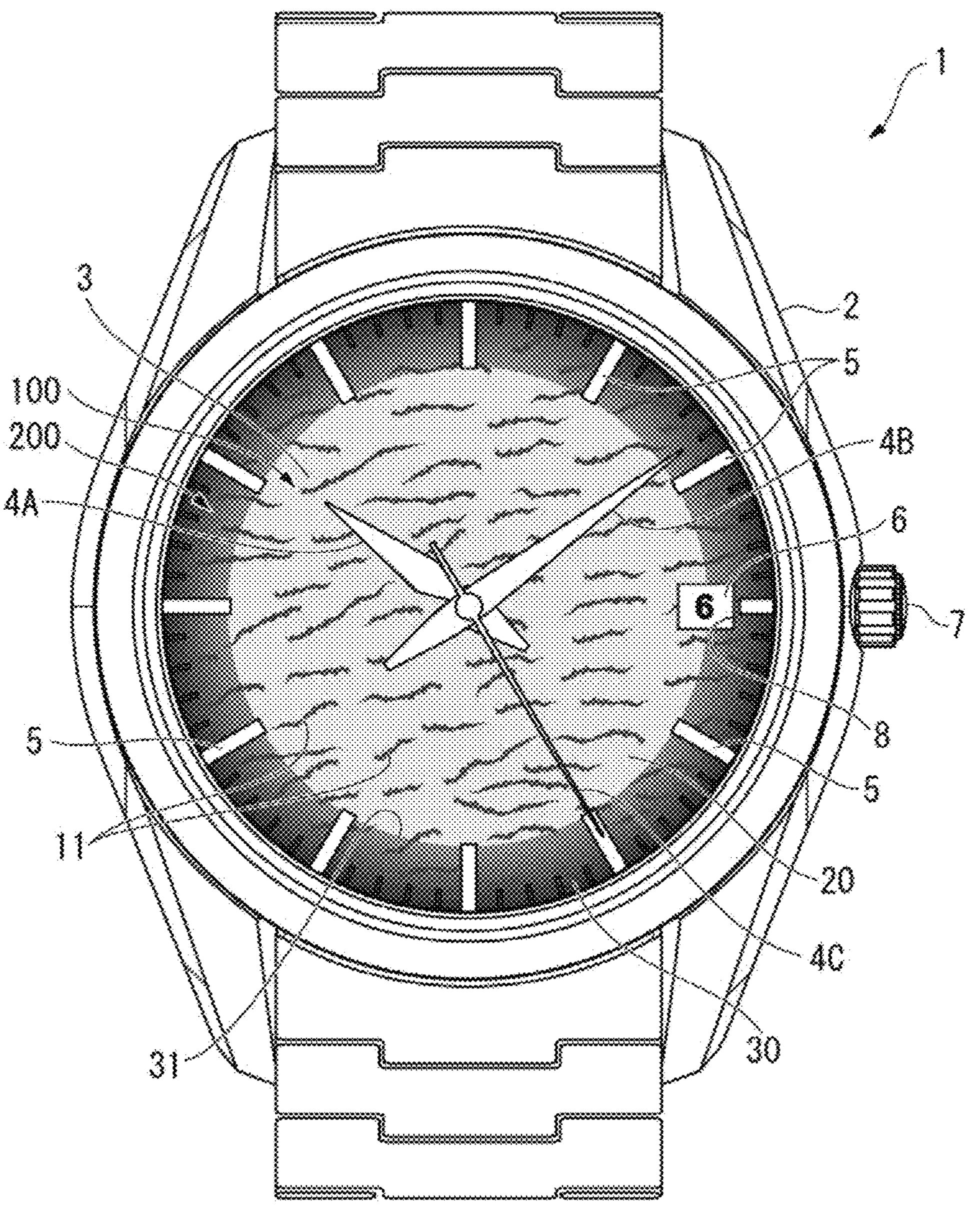
FIG. 1 is a front view illustrating a watch provided with a watch dial of a first embodiment.

FIG. 1 is a front view illustrating a watch 1 provided with a watch dial 3 of a first embodiment. The watch 1 is a wristwatch worn on the user's wrist, and includes a cylindrical exterior case 2. The watch dial 3 is disposed on the inner periphery side of the exterior case 2. The surface side opening of the two openings of the exterior case 2 is sealed with a cover glass, and the rear surface side opening is sealed with a case back. Further, the watch 1 includes a movement (not illustrated) housed in the exterior case 2, an hour hand 4A, a minute hand 4B and a seconds hand 4C for indicating time information, a rod-shaped index 5 attached to the watch dial 3, a date indicator 6 visually recognizable from a calendar daydate window 8 formed in the watch dial 3, and a crown 7.

Figure 2:
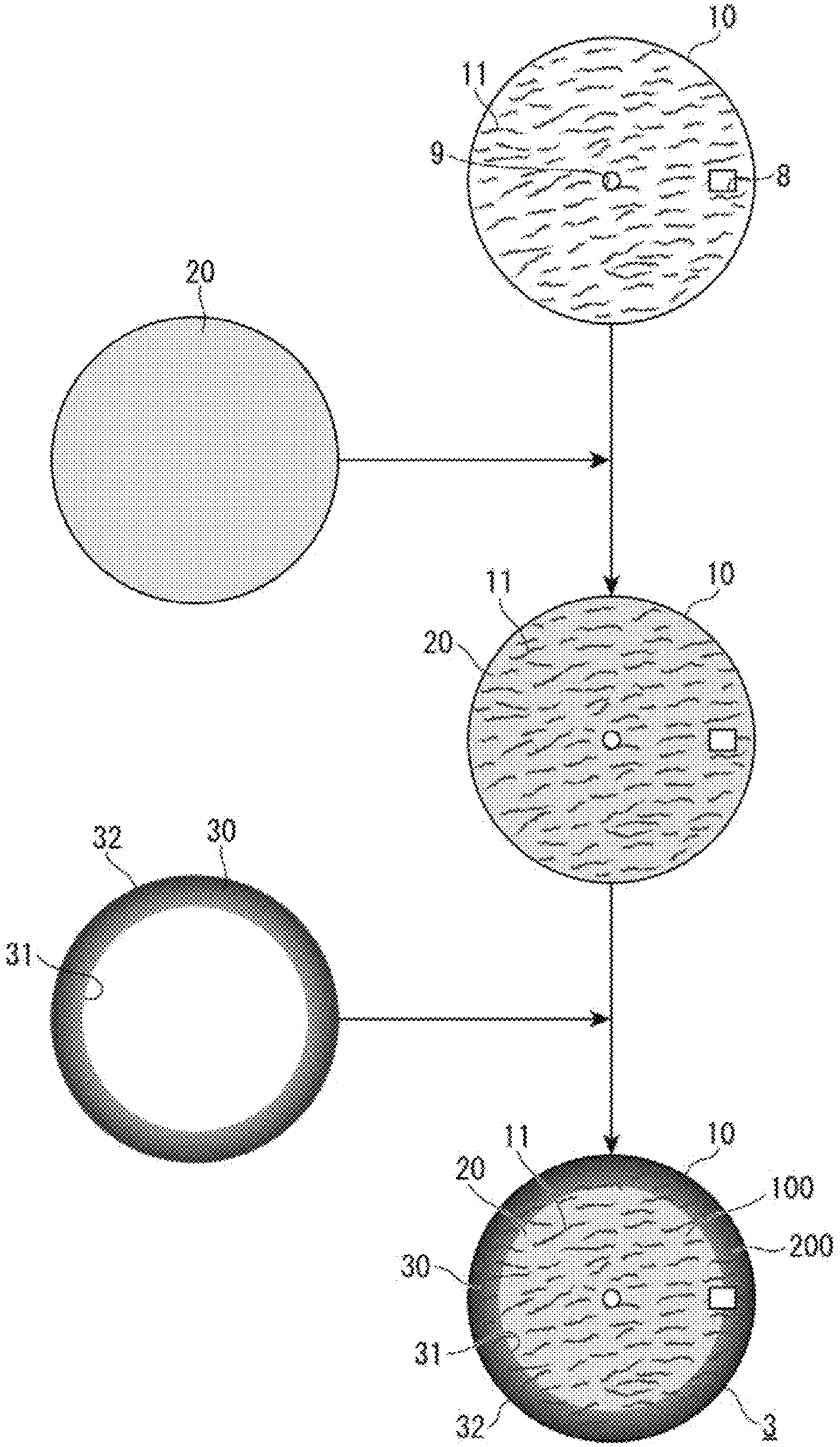
FIG. 2 is a diagram illustrating a manufacturing process for the watch dial of the first embodiment.
Figure 3:
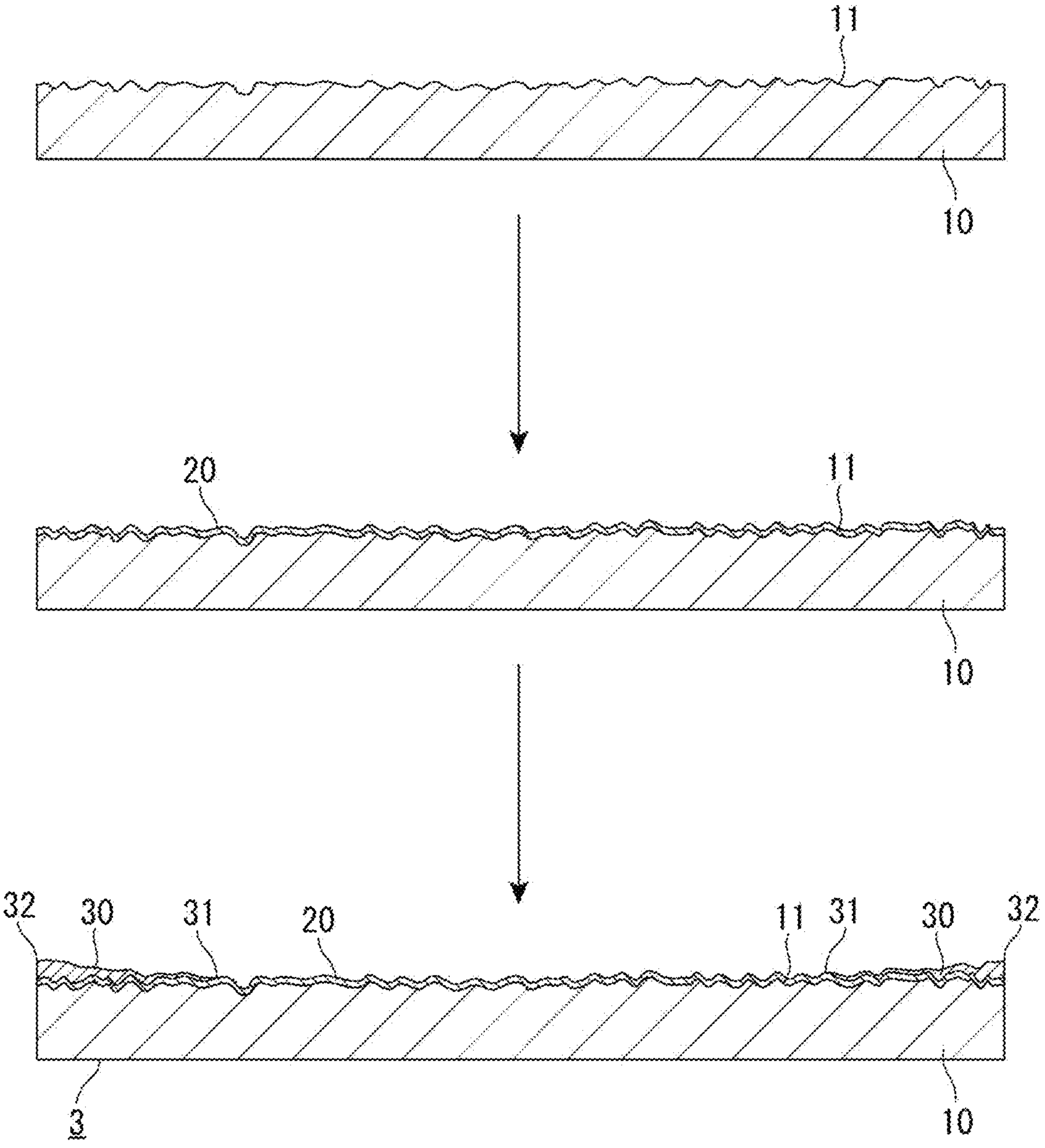
FIG. 3 is a diagram illustrating a manufacturing process for the watch dial of the first embodiment.
Figure 4:
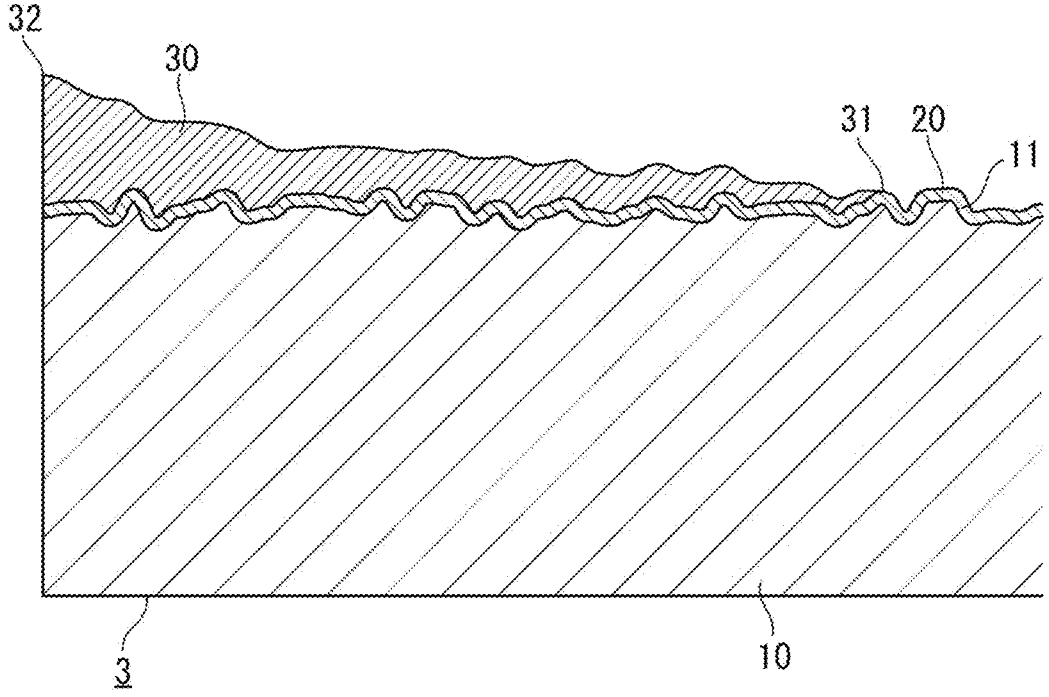
FIG. 4 is an enlarged sectional view illustrating an outer periphery part of the watch dial of the first embodiment.

As illustrated in FIGS. 2 to 4, the watch dial 3 includes a substrate 10, a first coloring film 20, and a second coloring film 30. As described later, the first coloring film 20 is formed over the entire surface of the substrate 10, and the second coloring film 30 is formed in an annular form on the outer periphery side of the surface of the first coloring film 20. As such, the watch dial 3 includes a first region 100 where the first coloring film 20 is exposed, and a second region 200 where the second coloring film 30 is exposed. The first region 100 is a circular region provided at the center of the surface of the substrate 10, of which the outer periphery substantially follows the inner end of the index 5. The second region 200 is an annular region provided on the outside of the first region 100.

Next, a manufacturing process for the watch dial 3 is described with reference to FIGS. 2 to 4. FIGS. 2 and 3 are diagrams illustrating a manufacturing process for the watch dial 3, and FIG. 4 is an enlarged sectional view of an outer periphery part of the watch dial 3.

Working Steps of Substrate

The substrate 10 is composed of a metal material, and examples of the metal material include Al, Ti, V, Cr, Fe, Co, Ni, Cu, Zn, Zr, Nb, Mo, In, Sn, Hf, Ta, W, Bi, Mg, alloys containing at least one of them, and the like.

An uneven pattern 11 is formed at the surface of the substrate 10 by machining such as emboss processing and laser processing. The step size of the unevenness of the pattern 11, i.e., the height dimension from the bottom of the concave portion to the top of the convex portion, is set in the range from 1 μm to 100 μm. Note that the step size of the unevenness of a common metal mold used for performing emboss processing on the surface of the substrate 10 of the watch dial 3 is 50 to 60 μm, and as such the emboss processing can be performed by using the same metal mold as the known metal mold.

The substrate 10 is also provided with the calendar daydate window 8 and a through hole 9 through which the hand pivot is inserted.

Forming Step for First Coloring Film

Next, the first coloring film 20 is formed by a dry plating method on the surface of the substrate 10. A physical evaporation method (PVD) and a chemical evaporation method (CVD) may be used for the dry plating method. The physical evaporation method is vacuum deposition, sputtering, ion plating and the like. The chemical evaporation method is thermal CVD, plasma CVD, laser CVD and the like.

The first coloring film 20 is composed of a stack of at least one layer of an oxide film or a fluoride film and at least one layer of a metal layer stacked. For the oxide film, $Ta_2O_5$, $SiO_2$, $TiO_2$, $Al_2O_3$, $ZrO_2$, $Nb_2O_5$, $HfO_2$ and the like can be used, for example. For the fluoride film, $Na_5Al_3F_{14}$, $Na_3AlF_6$, $AlF_3$, $MgF_2$, $CaF_2$, $BaF_2$, $YF_3$, $LaF_3$, $CeF_3$, $NdF_3$ and the like can be used, for example. For the metal layer, Ag, Pt, Au, Cu, Al, Cr, Sn, Fe, Ti, and an alloy thereof and the like can be used, for example.

The specific layer composition of the first coloring film 20 is set in accordance with the color indicated by the first coloring film 20. In addition, the film thickness of the first coloring film 20 is 1 μm or smaller, i.e., the step size of the unevenness of the pattern 11 of the substrate 10 or smaller, and has a substantially uniform film thickness in its entirety. As such, as illustrated in FIG. 3, the first coloring film 20 is stacked to follow the unevenness of the pattern 11 of the substrate 10, and the first coloring film 20 also has the same uneven pattern as that of the pattern 11.

In this embodiment, to obtain the first coloring film 20 of light blue, $SiO_2$ (with a thickness of 113 nm), Cr (with a thickness of 80 nm), $Nb_2O_5$ (with a thickness of 48 nm), Cr (with a thickness of 4.5 nm), $Al_2O_3$ (with a thickness of 19.8 nm), $Nb_2O_5$ (with a thickness of 13.5 nm), $SiO_2$ (with a thickness of 58.4 nm), and a clear layer are stacked in this order from the substrate 10 side. Note that the clear layer, which is a transparent protective layer formed of an acrylic resin or the like, may not be provided because it is not essential as the first coloring film 20.

The first coloring film 20 with the above-described layer composition includes $SiO_2$, $Nb_2O_5$ and $Al_2O_3$ as oxide films, and Cr as a metal layer.

Note that the above-mentioned layer composition is provided for setting the color of the first coloring film 20, while some layers have functions other than color setting. For example, $SiO_2$ with a thickness of 113 nm in contact with the substrate 10 and Cr with a thickness of 80 nm increase the adhesion to the substrate 10. $Al_2O_3$ increases the environmental resistance.

Forming Step of Second Coloring Film

Next, the second coloring film 30 is applied to a part of the surface of the first coloring film 20. For the coating method for the second coloring film 30, spin coating, dipping, brush coating, spray coating, electrostatic coating, electrodeposition coating and the like may be used. In addition, the coating material of the second coloring film 30 is not limited as long as it is a material that can be applied on the first coloring film 20, and acrylic pigment and the like can be used, for example.

In this embodiment, the first coloring film 20 is formed over the entire surface of the surface of the substrate 10, and the second coloring film 30 is formed in an annular form at the outer periphery part of the first coloring film 20. In this embodiment, the inner peripheral edge 31 of the second coloring film 30, i.e., the boundary with the first coloring film 20 is set in accordance with the inner end position of the index 5. In addition, an outer peripheral edge 32 of the second coloring film 30 is set to match the outer peripheral edge of the substrate 10 and the first coloring film 20.

As illustrated in FIGS. 3 and 4, the second coloring film 30 is applied such that the film thickness gradually increases from the inner peripheral edge 31 toward the outer peripheral edge 32. For example, the film thickness of the inner peripheral edge 31 is 1 μm, and the film thickness of the outer peripheral edge 32 is 10 μm. In view of this, the second coloring film 30 is configured such that the brightness gradually decreases as the film thickness increases from the inner peripheral edge 31 toward the outer peripheral edge 32.

The portion with the small film thickness on the inner peripheral edge 31 side in the second coloring film 30 is formed to follow the unevenness of the substrate 10 and the first coloring film 20, and the indicated color reflects the color of the first coloring film 20. In the portion with the large film thickness on the outer peripheral edge 32 side in the second coloring film 30, the influence of the unevenness of the substrate 10 and the first coloring film 20 is suppressed, and the uneven pattern is less recognized. In addition, the color indicated on the outer peripheral edge 32 side is mainly the color of the coating material of the second coloring film 30 with less influence of the color of the first coloring film 20.

For example, in the case where the first coloring film 20 is provided with a layer composition of light blue, and the second coloring film 30 is formed by applying a blue coating material, the first region 100 where the first coloring film 20 is exposed is light blue. The second region 200 where the second coloring film 30 is exposed is a color of a range of light blue to blue on the inner peripheral edge 31 side, and is dark blue on the outer peripheral edge 32 side. Specifically, the second region 200 has a gradation in which the brightness gradually decreases as it goes from the inner peripheral edge 31 toward the outer peripheral edge 32, i.e., with a distance from the boundary with the first region 100.

In addition, the layer composition of the first coloring film 20 and the type of the coating material of the second coloring film 30 are set such that a color difference ΔE* between the color of the first region 100, and the color of a portion with a largest film thickness in the second region 200, i.e., the outer peripheral edge 32, is within a predetermined range. The color difference is set in accordance with the design desired for the watch 1.

In addition, in the first region 100, the film thickness of the exposed first coloring film 20 is substantially constant, and thus the first region 100 has almost no color change and the same unified color. On the other hand, in the second region 200, the film thickness gradually increases from the inner peripheral edge 31 toward the outer peripheral edge 32 to form a gradation, and thus the color, mainly brightness, changes. In view of this, the color difference ΔE* is a comparison between the color of the first region 100 and the color of the outer peripheral edge 32 where the film thickness of the second region 200 is largest.

By setting the color difference ΔE* to 3 or less, the first region 100 and the second region 200 can be set to substantially the same color or similar colors, and a unified design can be created. For example, when the color difference ΔE* is set to 1.6 or less, it is possible to set substantially the same color, i.e., a degree with which a slight color difference can be recognized at the boundary portion where the first region 100 and the second region 200 are disposed next to each other. In addition, when the color difference ΔE* is 3, it is about the difference between dark blue and indigo blue.

In addition, by setting the color difference ΔE* to 3 to 40, it is possible to recognize a color change between the first region 100 and the second region 200. For example, in the case where the first region 100 is dark blue and the outer peripheral edge 32 of the second region 200 is black, the color difference ΔE* is about 40. Note that while it is possible to set the color difference ΔE* between the first region 100 and the outer peripheral edge 32 of the second region 200 to 40 or greater, it is preferable to set the color combination with consideration because the color difference is large.

In the watch dial 3, the brightness is set to be lower in the second region 200 than in the first region 100, and the brightness is set to be lower in the outer peripheral edge 32 than in the inner peripheral edge 31 also in the second region 200. In this manner, the center side in the watch dial 3 is bright, and the outer circumference side appears to be dark, thus giving the watch dial 3 a three-dimensional appearance.

Step of Attaching Index

After the second coloring film 30 is formed, the index 5 is attached to the substrate 10. The index 5 of this embodiment is of an implanted type obtained by implanting a silver-plated rod-shaped member into the substrate 10, for example.

The color of the index 5 can be set as necessary. For example, by setting a large color difference from the second coloring film 30, the visibility of the index 5 can be improved, for example. For example, the first coloring film 20 can be dark blue, the outer peripheral edge 32 of the second coloring film 30 can be black, and the index 5 can be silver. By setting E1<E2 and E1<E3 in the case where the color difference ΔE* between the first coloring film 20 and the outer peripheral edge 32 of the second coloring film 30 is E1, the color difference ΔE* between the first coloring film 20 and the index 5 is E2, and the color difference ΔE* between the second coloring film 30 and the index 5 is E3, the color of the index 5 can be set to a color with a large color difference from the first coloring film 20 and the second coloring film 30, and the visibility of the index 5 can be improved. In particular, by setting E2<E3 so that the color difference between the second coloring film 30 and the index 5 is larger than the color difference between the first coloring film 20 and the index 5, the visibility of the index 5 can be further improved.

Note that specific numerical values of E1, E2 and E3 may be set as necessary in accordance with the design of the watch dial 3. For example, E1 may be set to 3 to 40, E2 may be set to 40 to 80, E3 may be set to 80 to 100, and the like.

Effects of First Embodiment

The watch dial 3 is formed by forming the uneven pattern 11 on the surface of the substrate 10 by machining such as emboss processing, forming the first coloring film 20 by a dry plating method on the surface of the substrate 10 where the pattern 11 is formed, and further forming the second coloring film 30 by coating on a part of the surface of the first coloring film 20, and thus the watch dial 3 can have new aesthetics in comparison with a dial obtained by forming a vapor deposition film on the substrate.

In the first region 100 of the watch dial 3, the first coloring film 20 formed by a dry plating method is exposed, and this first coloring film 20 is composed of a stack of at least one layer of an oxide film or a fluoride film and at least one layer of a metal layer, and thus, greater angle dependence, and sharp appearance of the unevenness of the pattern 11 can be achieved. Specifically, the first coloring film 20 has an oxide film or a fluoride film that transmits light and causes interference, and thus greater angle dependence can be achieved. In addition, since the first coloring film 20 includes the metal layer that forms the base of the color, the color of the first coloring film 20 can be adjusted by selecting the material of the metal layer. Further, since a thin film with a uniform film thickness can be achieved by a dry plating method, sharp appearance of the uneven pattern 11 can be achieved. Thus, in addition to the design provided by the uneven pattern 11, the color can be changed in dependence on the angle of view with the large angle dependence, and the aesthetics can be improved.

In addition, in the second region 200 of the watch dial 3, the angle dependence is smaller than in the first region 100, and the appearance of the unevenness of the pattern 11 is less sharp than in the first region 100 because the applied second coloring film 30 is exposed.

In this manner, with the first region 100 and the second region 200, a change in appearance due to the difference in angle dependence between the first coloring film 20 and the second coloring film 30 and a change in sharpness of the uneven pattern 11 are generated in addition to the color change of the first coloring film 20 and the second coloring film 30, and thus new and complex expression can be achieved, which can improve the aesthetics of the watch dial 3.

In the second coloring film 30, the color of the second coloring film 30 is sequentially changed by gradually increasing the film thickness from the inner peripheral edge 31 toward the outer peripheral edge 32, and thus a color change of the coating gradation can be additionally provided to the second region 200. In this manner, in the first region 100 and the second region 200 the user of the watch 1 can visually recognize multiple changes, including the color change and the angle-dependent change of the first coloring film 20 and the second coloring film 30, the change in sharpness of the uneven pattern 11, and the color change of the coating gradation, and thus the aesthetics of the watch dial 3 can be still further improved.

In the watch dial 3, the brightness of the first region 100 provided on the center side is high, the brightness of the second region 200 on the outer circumference side is low, and further the brightness gradually decreases from the inner peripheral edge 31 toward the outer peripheral edge 32 also in the second region 200, and thus, the watch dial 3 can be visually recognized in a three-dimensional manner, which can also improve the aesthetics of the watch dial 3.

Since the first coloring film 20 is composed of a multi layer film including at least one layer of a metal layer and at least one layer of an oxide film or a fluoride film, coloring with a desired color can be achieved by appropriately setting the material and film thickness of each film.

The second coloring film 30 is a coating of an acrylic coating material, and therefore can be colored in a desired color by selecting the color of the coating material.

Therefore, the watch dial 3 with various color tones can be easily manufactured, and the design variation can be easily increased.

Since a metal material is used for the substrate 10, there is fewer limitations when forming the first coloring film 20 and the second coloring film 30, thus allowing for free structure decoration. Specifically, in the case where a solar panel is disposed on the rear surface side of the watch dial, the watch dial has to transmit the light, an optically transparent resin substrate has to be used, and there is a limitation on the film formed on the substrate to ensure light transmittance. In view of this, the watch dial 3 of this embodiment does not need to take into account the light transmission, and has no limitation in terms of decoration and processing of the uneven pattern 11 on the surface, thus achieving free structure decoration.

Second Embodiment

Figure 5:
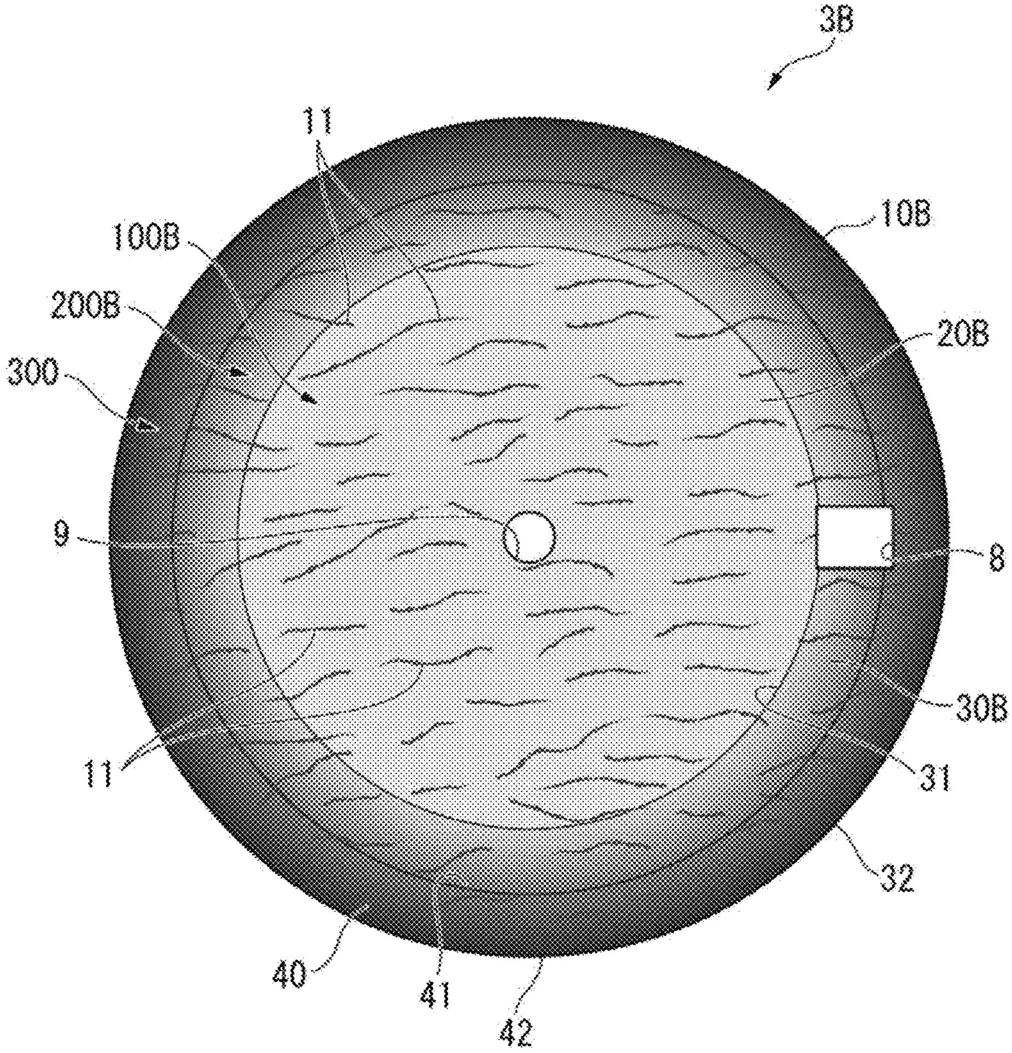
FIG. 5 is a front view illustrating a watch dial of a second embodiment.
Figure 6:
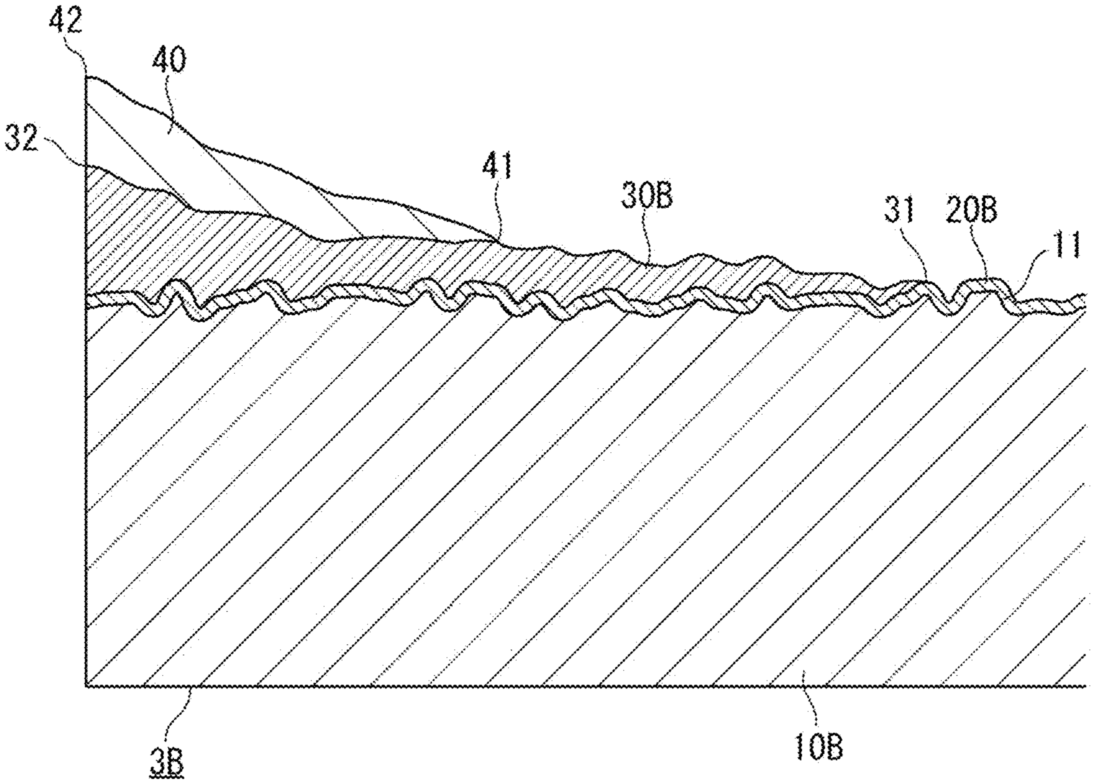
FIG. 6 is an enlarged sectional view illustrating an outer periphery part of the watch dial of the second embodiment.

A watch dial 3B of the second embodiment is described below with reference to FIGS. 5 and 6. The watch dial 3B includes a substrate 10B, a first coloring film 20B, a second coloring film 30B, and a third coloring film 40.

The substrate 10B, the first coloring film 20B and the second coloring film 30B have the same configuration as those of the substrate 10, the first coloring film 20 and the second coloring film 30 of the first embodiment, and therefore the description thereof is omitted.

The third coloring film 40 is formed by coating on a part of the surface of the second coloring film 30B. For the coating method for the third coloring film 40, spin coating, dipping, brush coating, spray coating, electrostatic coating, electrodeposition coating and the like may be used as with the second coloring film 30B. In addition, the coating material of the third coloring film 40 is not limited as long as it is a material that can be applied on the second coloring film 30B, and, for example, acrylic pigment and the like can be used.

In this embodiment, the third coloring film 40 is formed in an annular form at the outer periphery part of the second coloring film 30B. An inner peripheral edge 41 of the third coloring film 40, i.e., the boundary with the second coloring film 30B is set at an approximate intermediate position of the inner peripheral edge 31 and the outer peripheral edge 32 of the second coloring film 30B, and an outer peripheral edge 42 of the third coloring film 40 is set to match the outer peripheral edge of the second coloring film 30B.

As with the second coloring film 30B, the third coloring film 40 is applied such that the film thickness gradually increases from the inner peripheral edge 41 toward the outer peripheral edge 42. For example, the film thickness of the inner peripheral edge 41 is 1 μm, and the film thickness of the outer peripheral edge 42 is 10 μm. In this manner, as with the second coloring film 30B, the third coloring film 40 is configured such that the brightness gradually decreases as the film thickness increases from the inner peripheral edge 41 toward the outer peripheral edge 42.

Since the third coloring film 40 is formed on the second coloring film 30B, the pattern 11 of the substrate 10B is difficult to recognize.

In the watch dial 3B, the center portion where the first coloring film 20B is exposed is the first region 100B, the outer periphery part of the first region 100B where the second coloring film 30B is exposed is the second region 200B, and the outer periphery part of the second region 200B where the third coloring film 40 is exposed is a third region 300.

The colors of the first coloring film 20B, the second coloring film 30B and the third coloring film 40 may be set as necessary in the same manner as in the first embodiment, while the first coloring film 20B has a layer composition for indicating light blue, the second coloring film 30B is applied with a blue coating material, and the third coloring film 40 is applied with a black coating material, for example.

Effects of Second Embodiment

The watch dial 3B of the second embodiment includes the same substrate 10B, first coloring film 20B, and second coloring film 30B as those of the watch dial 3 of the first embodiment, and thus the same effects as those of the first embodiment are achieved. Further, since the third coloring film 40 is formed by coating on the second coloring film 30B such that the three regions, i.e., the first region 100B, the second region 200B, and the third region 300 are formed in the watch dial 3B, more complex designs are achieved compared to the watch dial 3 of the first embodiment, and aesthetics can be further improved.

Third Embodiment

Figure 7:
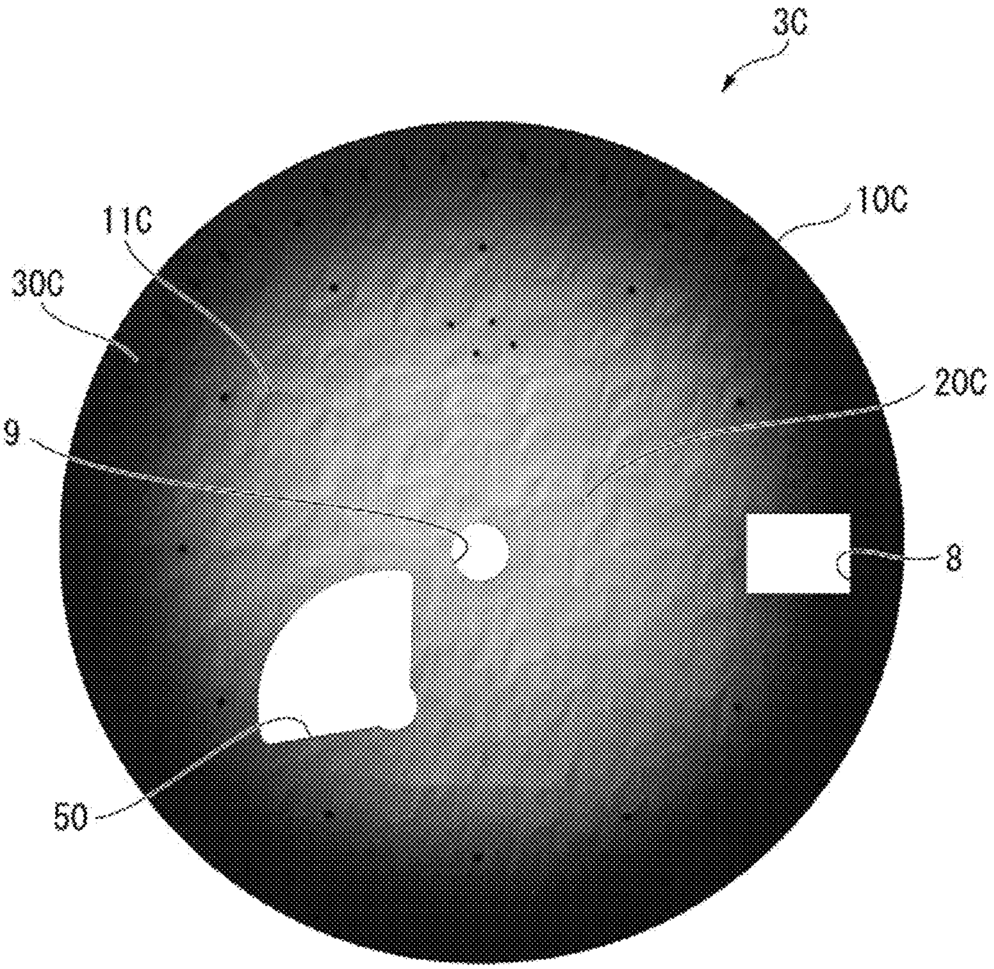
FIG. 7 is a front view illustrating a watch dial of a third embodiment.

A watch dial 3C of a third embodiment is described below with reference to FIG. 7. The watch dial 3C includes a substrate 10C, a first coloring film 20C and a second coloring film 30C.

As with the substrate 10 of the first embodiment, the substrate 10C is composed of a metal material, and an uneven pattern 11C is formed at the surface through metal processing. In addition, in the substrate 10C, an opening 50 where a fan-shaped sub-dial for power reserve is attached is formed in addition to the through hole 9 for inserting the hand pivot and the calendar daydate window 8 for exposing the date indicator 6.

As with the first coloring film 20, the first coloring film 20C is formed at the surface of the substrate 10C by a dry plating method. In this embodiment, to obtain the first coloring film 20C of silver, $SiO_2$ (with a thickness of 113 nm), Cr (with a thickness of 70 nm), Ag (with a thickness of 160 nm), $Al_2O_3$ (with a thickness of 147 nm), $SiO_2$ (with a thickness of 69.8 nm), and a clear layer are stacked in this order from the substrate 10C side. Note that the clear layer may be or may not be provided as in the first embodiment.

The first coloring film 20C with the above-described layer composition includes $SiO_2$ and $Al_2O_3$ as oxide films, and Cr and Ag as metal layers.

As with the second coloring film 30, the second coloring film 30C is applied with a black coating material, and is formed such that the film thickness increases from the inner peripheral edge toward the outer peripheral edge to form a gradation.

Effects of Third Embodiment

The watch dial 3C of the third embodiment can achieve the same effects as those of the first embodiment.

Modifications

Figure 8:
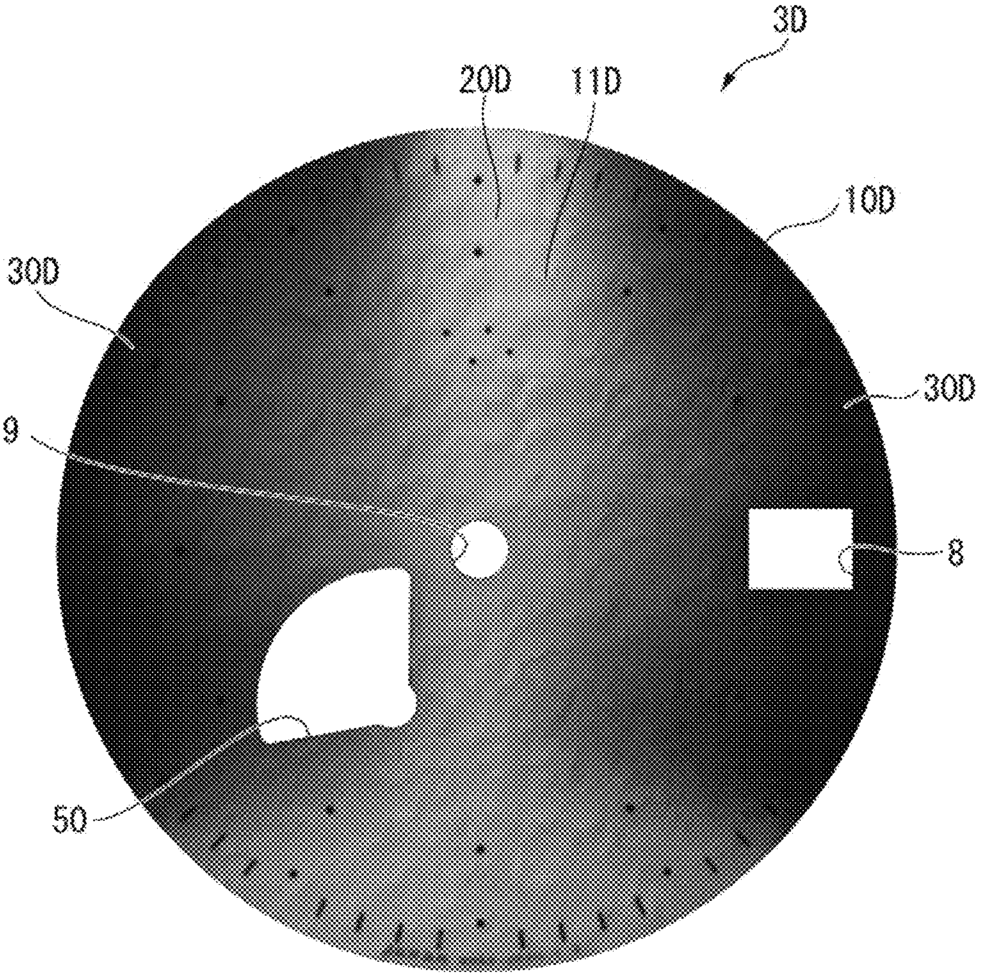
FIG. 8 is front view illustrating a watch dial of a modification.

The first region, second region and third region of the watch dial are not limited to planar circular regions or annular regions. For example, the watch dial 3D of the third embodiment illustrated in FIG. 8 includes a substrate 10D where a pattern 11D is formed at the surface as with the substrate 10C. The first coloring film 20D is formed at the surface of the substrate 10D by a dry plating method, and the second coloring film 30D is formed by coating on a part of the first coloring film 20D.

As with the first coloring film 20C, the first coloring film 20D is formed over the entire surface of the substrate 10D. The second coloring film 30D is formed on the 3 o'clock side and the 9 o'clock side in the watch dial 3D. In this manner, the first coloring film 20D is provided to include the center line connecting the 12 o'clock position and the 6 o'clock position in the watch dial 3D. The second coloring film 30D is provided on the 3 o'clock position side and 9 o'clock position side with respect to the first coloring film 20D in the watch dial 3D. Note that in the watch dial 3D the second coloring film 30D is formed in parallel to the center line connecting 12 o'clock and 6 o'clock from the 12 o'clock position to the vicinity of the opening 50, such that the first coloring film 20D is formed in a belt shape with a constant width. In addition, from the vicinity of the opening 50, the second coloring film 30D is obliquely formed toward an approximate 4.5 o'clock position and an approximate 7.5 o'clock position, and the first coloring film 20D is also formed to spread in a fan shape. By appropriately setting the coating region of the second coloring film 30D in this manner, the design variation of the watch dial can be further increased.

The first coloring film that is formed at the surface of the substrate by a dry plating method may not be formed over the entire surface of the substrate, but may be formed only in the first region that is not covered with the second coloring film and/or the third coloring film. In this case, the first coloring film can be formed by a dry plating method by masking the region other than the first region of the substrate.

In addition, the first region where the first coloring film is exposed may be formed on the outer periphery side in the substrate, and the second region where the second coloring film is exposed may be formed on the center side in the substrate.

The second coloring film and the third coloring film are not limited to films of which the film thickness increases as they go away from the first coloring film, but may be applied to have a substantially uniform film thickness, or may be applied to have a film thickness that decreases as they go away from the first coloring film. Specifically, the film thicknesses of the second coloring film and the third coloring film may be appropriately set in consideration of the color change design based on the change of the film thickness.

The film thickness of the second coloring film formed by coating may be equal to or greater than the step size of the unevenness on the substrate surface, or may be smaller than the step size of the unevenness. When the film thickness of the second coloring film is equal to or greater than the step size of the unevenness of the substrate, the pattern of the unevenness is less noticeable, and thus the second region with reduced effects of the pattern can be achieved.

The index on the watch dial is not limited to rod-shaped ones, but may have a wedge shape, a round shape, or other shapes, and may also be Arabic or Roman numerals. In addition, the index is not limited to the implanted type, but may be formed by pad printing.

The planar shape of the watch dial is not limited to a circular shape, and various shapes such as a rectangular shape, a square shape, a barrel shape, an ellipse shape, and an octagonal shape may be employed. In addition, the first region, the second region and the third region may be set to match the planar shape of the watch dial.

Therefore, the shape of the watch dial, the pattern of the surface, the material, formation region and formation method of the multi layer film of the first coloring film, the type of the coating material, formation region and formation method of the second coloring film, whether to provide the third coloring film and the like may be appropriately set in accordance with the design of the watch dial.

Overview of Present Disclosure

A watch dial of the present disclosure includes a base material made of metal with a surface having unevenness formed by machining, a first coloring film formed at the surface of the base material by a dry plating method, and including a stack of at least one layer of an oxide film or a fluoride film, and at least one layer of a metal layer, and a second coloring film formed on a part of the first coloring film by coating.

According to the watch dial of the present disclosure, since the first coloring film is formed by a dry plating method on the surface of the substrate where unevenness is formed by machining, and further the second coloring film is formed by coating on a part of the surface of the first coloring film, the watch dial of the present disclosure can have new aesthetics in comparison with a dial obtained by forming a vapor deposition film on the substrate. Since the first coloring film is composed of a stack of at least one layer of an oxide film or a fluoride film and at least one layer of a metal layer, greater angle dependence, and sharp appearance of the unevenness of the pattern can be achieved. Since the second coloring film is formed by coating, the angle dependence is smaller than that of the first coloring film, and the appearance of the unevenness of the pattern is less sharp than that of the first coloring film.

In this manner, since a change in appearance due to the difference in angle dependence between the first coloring film and the second coloring film, and a change in sharpness of the pattern of the unevenness are generated in addition to the color change of the first coloring film and the second coloring film, new and complex expression can be achieved, and the aesthetics of the watch dial can be improved.

In the watch dial of the present disclosure, a first region where only the first coloring film is formed at the surface of the base material, and a second region where the first coloring film and the second coloring film are formed at the surface of the base material may be provided, and a film thickness of the second coloring film may gradually increase with a distance from a boundary with the first region.

According to the watch dial of the present disclosure, since the second coloring film has a film thickness that gradually increases with a distance from the boundary with the first region, the color of the second coloring film can be sequentially changed, and a color change of the coating gradation can be additionally provided to the second region. In this manner, the user of the watch can visually recognize multiple changes including the color change of the first coloring film and the second coloring film, the angle-dependent change, the change in sharpness of the pattern of the unevenness, and the color change of the coating gradation, and thus the aesthetics of the watch dial can be still further improved.

In the watch dial of the present disclosure, the first region may be provided at a center of the surface of the base material, the second region may be provided outside the first region, and the film thickness of the second coloring film may gradually increase toward an outer periphery of the base material.

According to the watch dial of the present disclosure, the first region utilizing the pattern of the unevenness of the substrate can be formed at a center part of the watch dial, and the design quality can be improved. In addition, since the film thickness of the second coloring film gradually increases toward the outer periphery of the base material, the color of the second coloring film can be sequentially changed, and a color change of the coating gradation can be additionally provided to the second region. In this manner, the user of the watch can visually recognize multiple changes including the color change of the first coloring film and the second coloring film, the angle-dependent change, the change in sharpness of the pattern of the unevenness, and the color change of the coating gradation from the center of the dial toward the outer periphery, and thus the aesthetics of the watch dial can be still further improved.

In the watch dial of the present disclosure, a color difference between a color of the first region and a color of a portion where the film thickness is largest in the second region may be within a predetermined range.

According to the watch dial of the present disclosure, the change of the color of the first region and the color of the second region can be set within a predetermined range, and the design image of the watch dial can be unified.

In the watch dial of the present disclosure, the color difference may be 3 or less.

According to the watch dial of the present disclosure, the first region and the second region can be set to substantially the same color or similar colors, and a unified design can be created.

In the watch dial of the present disclosure, the color difference may be 3 to 40.

According to the watch dial of the present disclosure, a change in color of the first region and the second region can be recognized, and the design quality can be improved with the combination of the colors.

In the watch dial of the present disclosure, a brightness of the first region may be higher than a brightness of the second region, and the brightness of the second region may gradually decrease with a distance from the boundary with the first region.

According to the watch dial of the present disclosure, since a constant brightness can be maintained in the first region and the brightness of a portion away from the first region is lower than that of the boundary with the first region in the second region, the brightness can be smoothly changed in the watch dial, and thus the design quality can be improved.

In the watch dial of the present disclosure, the first region may be provided at the center of the surface of the base material, and the second region may be provided at an outer periphery of the first region.

According to the watch dial of the present disclosure, since the center side in the watch dial is bright, and the outer circumference side appears to be dark, a three-dimensional appearance can be provided in the watch dial.

In the watch dial of the present disclosure, the first region may be provided to include a center line connecting a 12 o'clock position and a 6 o'clock position in the watch dial in the base material, and the second region may be provided on a 3 o'clock position side and a 9 o'clock position side with respect to the first region in the watch dial.

According to the watch dial of the present disclosure, since the first region can be disposed along the center line connecting the indices at the 12 o'clock and 6 o'clock in the watch dial, and the second region can be disposed on the 3 o'clock side and 9 o'clock side with the first region therebetween, a bilaterally symmetric design can be provided to the watch dial.

In the watch dial of the present disclosure, the metal layer may include one type selected from among Ag, Pt, Au, Cu, Al, Cr, Sn, Fe, Ti, or, an alloy thereof, and the oxide film or the fluoride film may include one type selected from among $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, and, $NdF_3$.

According to the watch dial of the present disclosure, by appropriately selecting the metal layer, and the oxide film or the fluoride film, the color of the first coloring film can be set in various manners.

The watch dial of the present disclosure may further include a third coloring film formed by coating on a part of the second coloring film.

According to the watch dial of the present disclosure, since the third coloring film is further provided, more complex designs can be achieved as a watch dial, and the aesthetics can be further improved.

A watch of the present disclosure includes an exterior case, and the above-described watch dial that is disposed inside the exterior case.

According to the watch of the present disclosure, since the first coloring film is formed by a dry plating method on the surface of the substrate where unevenness is formed by machining, and further the second coloring film is formed by coating on a part of the surface of the first coloring film, the aesthetics of the watch dial and the watch can be improved.

What is claimed is:

1. A watch dial comprising:

a base material made of metal with a surface having unevenness formed by machining;

a first coloring film formed at the surface of the base material by a dry plating method, and including a stack of at least one layer of an oxide film or a fluoride film, and at least one layer of a metal layer; and a second coloring film formed on a part of the first coloring film by coating, wherein a first region where only the first coloring film is formed at the surface of the base material, and a second region where the first coloring film and the second coloring film are formed at the surface of the base material are provided, and a film thickness of the second coloring film gradually increases with a distance from a boundary with the first region.

2. The watch dial according to claim 1, wherein the first region is provided at a center of the surface of the base material, the second region is provided outside the first region, and the film thickness of the second coloring film gradually increases toward an outer periphery of the base material.

3. The watch dial according to claim 1, wherein a color difference ΔE between a color of the first region and a color of a portion where the film thickness is largest in the second region is within a predetermined range.

4. The watch dial according to claim 3, wherein the color difference ΔE is 3 or less.

5. The watch dial according to claim 3, wherein the color difference ΔE is 3 to 40.

6. The watch dial according to claim 1, wherein the metal layer includes one type selected from among Ag, Pt, Au, Cu, Al, Cr, Sn, Fe, Ti, or an alloy thereof, and the oxide film or the fluoride film includes one type selected from among $Ta_2O_5$, $SiO_2$, $TiO_2$, $Al_2O_3$, $ZrO_2$, $Nb_2O_5$, $HfO_2$, $Na_5Al_5F_{14}$, $Na_5AlF_6$, $AlF_3$, $MgF_2$, $CaF_2$, $BaF_2$, $YF_3$, $LaF_3$, $CeF_3$, and $NdF_3$.

7. The watch dial according to claim 1, further comprising a third coloring film formed by coating on a part of the second coloring film.

8. A watch comprising:

an exterior case; and the watch dial according to claim 1 disposed inside the exterior case.

* * * * *